US012715071B2

(12) United States Patent
Kuriya et al.

(10) Patent No.: US 12,715,071 B2
(45) Date of Patent: Aug. 25, 2026

(54) METHOD OF REPROCESSING METAL PRODUCT

(71) Applicant: DMG MORI CO., LTD, Nara (JP)

(72) Inventors: Tatsuhiko Kuriya, Nara (JP); Yoko Hirono, Nara (JP)

(73) Assignee: DMG MORI CO., LTD, Nara (JP)

(*) Notice: Subject to any disclaimer, the term of this patent is extended or adjusted under 35 U.S.C. 154(b) by 883 days.

(21) Appl. No.: 18/007,668

(22) PCT Filed: May 25, 2021

(86) PCT No.: PCT/JP2021/019871
§ 371 (c)(1),
(2) Date: Dec. 1, 2022

(87) PCT Pub. No.: WO2021/246247
PCT Pub. Date: Dec. 9, 2021

(65) Prior Publication Data
US 2023/0088641 A1 Mar. 23, 2023

(30) Foreign Application Priority Data
Jun. 3, 2020 (JP) ................................ 2020-097193

(51) Int. Cl.
*B23K 26/34* (2014.01)

(52) U.S. Cl.
CPC .................................... *B23K 26/34* (2013.01)

(58) Field of Classification Search
CPC .......... B23K 2101/001; B23K 20/1205; B23K 20/126; B23K 2103/50; B23K 26/32; B23K 15/0086; B23K 26/34; B23K 26/342; B23K 35/0244; B23K 9/04
USPC ........................................... 219/121.66, 391
See application file for complete search history.

(56) References Cited

U.S. PATENT DOCUMENTS

| | | | |
|---|---|---|---|
| 4,128,929 | A | 12/1978 | DeMusis |
| 5,148,635 | A | 9/1992 | Porter |
| 6,681,464 | B1 | 1/2004 | Dupuis et al. |
| 2004/0083024 | A1 | 4/2004 | Wang |
| 2004/0123447 | A1 | 7/2004 | Ahti et al. |

(Continued)

FOREIGN PATENT DOCUMENTS

| | | | |
|---|---|---|---|
| CN | 108202202 | A | 6/2018 |
| CN | 209453279 | U | 10/2019 |

(Continued)

OTHER PUBLICATIONS

International Search Report Application No. PCT/JP2021/019871 dated, Jul. 13, 2021, 13 pages.

(Continued)

*Primary Examiner* — Chris Q Liu
(74) *Attorney, Agent, or Firm* — Stinson LLP

(57) ABSTRACT

A method of reprocessing a metal product includes a welding step for welding a dummy member to the metal product, a reprocessing step for reprocessing the metal product in a state where the metal product is supported by a first support unit and the dummy member is supported by a second support unit, and a removal step for removing the dummy member from the metal product after the reprocessing step. The reprocessing of the metal product while the metal product is fixed is thus enabled without restriction from the shape of the metal product.

9 Claims, 13 Drawing Sheets

(56) References Cited

U.S. PATENT DOCUMENTS

| | | | |
|---|---|---|---|
| 2004/0124573 A1 | 7/2004 | Elman et al. | |
| 2005/0152758 A1 | 7/2005 | Elman et al. | |
| 2005/0262683 A1 | 12/2005 | Ahti et al. | |
| 2007/0044306 A1 | 3/2007 | Szela et al. | |
| 2016/0076376 A1 | 3/2016 | Trickey et al. | |
| 2017/0008123 A1 | 1/2017 | Mezawa | |
| 2017/0130591 A1* | 5/2017 | Bunker | B23K 26/34 |
| 2019/0176273 A1* | 6/2019 | Srinivasan | B23K 26/1476 |

FOREIGN PATENT DOCUMENTS

| | | | |
|---|---|---|---|
| EP | 1435276 | B1 | 5/2006 |
| EP | 1759799 | A | 3/2007 |
| EP | 2998060 | B1 | 1/2019 |
| FR | 2962357 | A1 | 1/2012 |
| JP | S56132001 | U1 | 10/1981 |
| JP | H326453 | A | 2/1991 |
| JP | 2004050303 | A | 2/2004 |
| JP | 2007098436 | A | 4/2007 |
| JP | 2009039746 | A | 2/2009 |
| JP | 2011073018 | A | 4/2011 |
| JP | 2013035075 | A | 2/2013 |
| JP | 2019157149 | A | 9/2019 |
| JP | 2020037122 | A | 3/2020 |
| JP | 2002004883 | A | 1/2022 |

OTHER PUBLICATIONS

European Patent Office, Extended European Search Report, Application No. 21817043.9, Jun. 6, 2024, 9 pages.

* cited by examiner

METHOD OF REPROCESSING METAL PRODUCT

REFERENCE TO RELATED APPLICATION

This application is a 371 U.S. National Stage Application of International Patent Application No. PCT/JP2021/019871, filed May 25, 2021, which claims the benefit of JP Application No. 2020-097193, filed Jun. 3, 2020, the entire disclosures of which are incorporated herein by reference.

TECHNICAL FIELD

The present disclosure relates to a method of reprocessing a metal product, which utilizes a machine tool.

BACKGROUND ART

A laser additive manufacturing method (additive manufacturing) has started to become widespread, in which a molded object is formed on a surface of a workpiece while laser light and metal powder are supplied. For example, Patent Literature (PTL) 1 suggests a laser additive manufacturing method, which is a method of forming a molded object on a surface of a workpiece by using a laser additive manufacturing apparatus including a head with an irradiation unit for irradiating an irradiation area with laser light and a supply unit for suppling metal powder to the irradiation area, and a movement mechanism for relatively moving the head and the workpiece. In the method, the molded object is formed by performing a remelting process at least once, the process including a cladding step in which, in a state where the irradiation with the laser light and the supply of the metal powder are performed, a cladding resultant constituted of a plurality of layers is formed on the workpiece by performing a process of moving the head with respect to the workpiece to yield the cladding for a plurality of times, and a remelting step in which, in a state where the irradiation with the laser light is performed and the supply of the metal powder is not performed, remelting is caused after the cladding step by moving the head with respect to the workpiece and irradiating a surface of the cladding resultant with the laser light.

CITATION LIST

Patent Literature

[PTL 1] Japanese Patent Application Laid-Open Publication No. 2019-157149

SUMMARY OF INVENTION

Technical Problem

There is a desire to recover a metal component (a ready-made article) having been processed into a shape that has a predetermined function. For example, a large metal component, such as a rocket nozzle or a turbine blade, is reprocessed or repaired for a plurality of times to be used instead of being expendable.

However, when a metal component that has been processed into a shape that already has a predetermined function is reprocessed using a machine tool, it can be difficult for the metal component to be supported by a predetermined support unit that the machine tool includes. For example, a machine tool includes a support unit with a chuck mechanism for fixing a workpiece. Such a support unit can fail to hold a metal component having been processed into a shape that already has a predetermined function and stable fixing of the metal component can be difficult.

Solution to Problem

An aspect of the present invention relates to a method of reprocessing a metal product, the method including a welding step for welding a dummy member to the metal product, a reprocessing step for reprocessing the metal product in a state where the metal product is supported by a first support unit and the dummy member is supported by a second support unit, and a removal step for removing the dummy member from the metal product after the reprocessing step.

Advantageous Effects of Invention

Reprocessing of a metal product while the metal product is fixed is enabled without restriction from the shape of the metal product.

While the novel features of the present invention are recited in the appended claims, the present invention, both as to organization and content, will be better understood, along with other objects and features of the present application, from the following detailed description taken in conjunction with the drawings.

BRIEF DESCRIPTION OF DRAWING

FIG. 1 is a front view that illustrates an overview of the inside of an example of a machine tool used in the present embodiment.

DESCRIPTION OF EMBODIMENTS

Figure 2:
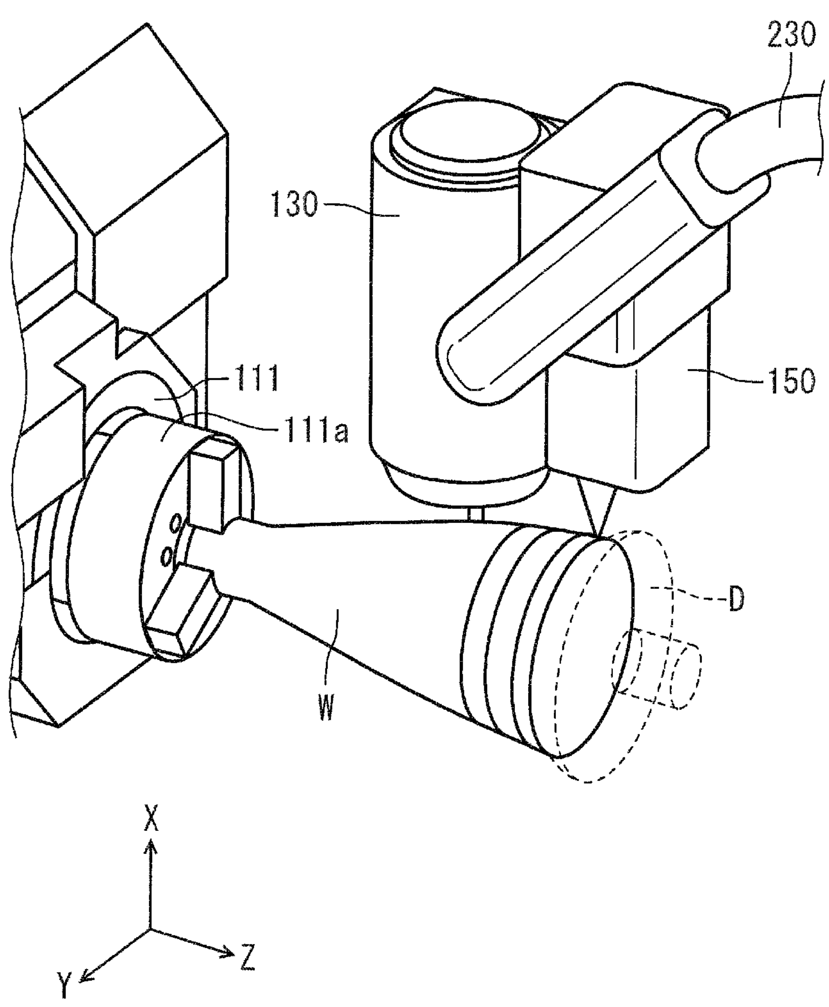
FIG. 2 is a perspective view that illustrates how it looks in a machining space when the machine tool performs an AM process.

A method of reprocessing a metal product according to the present embodiment includes (i) a welding step for welding a dummy member to the metal product, (ii) a reprocessing step for reprocessing the metal product in a state where the metal product is supported by a first support unit and the dummy member is supported by a second support unit, and (iii) a removal step for removing the dummy member from the metal product after the reprocessing step.

Herein, to "support" is a concept including fixing, holding, and the like, and widely denotes inhibiting movements, such as vibration, shaking, and chattering, through contact with the metal product (or the dummy member).

In addition, it is just desired for the "metal product" to be a ready-made article, such as a metal component, which is formed of metal at least partially. The ready-made article is a structure having been processed into a shape that has a predetermined function. That is, in the reprocessing method according to the present embodiment, the metal product as an object to be reprocessed already has a predetermined function before the dummy member is welded. However, the metal product needs reprocessing (or repair).

The metal product may be a structure where the dummy member has already been connected to a ready-made article by welding. That is, in the method according to the present embodiment before the dummy member is welded, the metal product as an object to be reprocessed may be a combination of a structure having been processed into a shape that already has a predetermined function and another dummy member. In this case, at least two dummy members are connected to the metal product by welding at the time of reprocessing.

Specific examples of the metal product can include a relatively large metal product utilized in the aviation industry, the space industry, and the energy industry, such as a rocket nozzle or a turbine blade, which is not particularly limited. In many cases, such a relatively large metal product has a shape that makes it difficult for a support unit typically included in a machine tool to support or fix the product securely.

A material for the metal product can be, for example, at least one selected from a group consisting of a titanium-based alloy, a cobalt-based alloy, and a nickel-based alloy but is not limited thereto.

When the metal product is reprocessed, the metal product needs to be securely supported or fixed so as to increase the accuracy of the reprocessing. Otherwise, the metal product vibrates while being reprocessed and the accuracy of the reprocessing decreases.

When a workpiece prior to transition to the metal product (that is, a raw material for the metal product) is processed, the workpiece is formed so as to have a shape that facilitates support with a support unit included in the machine tool. The support unit included in the machine tool is, for example, a chuck mechanism provided on a main shaft, a workpiece support, a steady rest, a tailstock, or the like. However, it can be difficult for the metal product having been processed into a shape that already has a predetermined function to be supported by such a support unit.

In contrast, support of the metal product by the support unit can be facilitated by welding a dummy member having a shape that facilitates the support by the support unit to the metal product in advance. For example, reprocessing of the metal product in a state where the metal product is fixed securely is enabled by a first support unit supporting the metal product and a second support unit supporting the dummy member welded to the metal product. Since the dummy member is a material unnecessary when the metal component exerts a predetermined function, the dummy member may be removed from the metal product after the reprocessing ends.

The welding step and the reprocessing step may be performed in a machining space of the machine tool that includes a welding torch used in the welding step and the tool main shaft used in the reprocessing step. Although not particularly limited, the welding method can be, for example, laser welding, electron beam welding, arc welding, or the like. In this case, the machine tool is a hybrid processing machine capable of an additive process (additive manufacturing) (hereinafter referred to as an AM process) on the workpiece or the metal product, and a removal process (subtractive manufacturing) (hereinafter referred to as an SM process) on the workpiece or the metal product. The machine tool has a turning function that uses a fixed tool and a milling function that uses a rotary tool for example as functions for the SM process.

When the machine tool includes a complex lathe, one of the first support unit and the second support unit can be a chuck mechanism provided on a main shaft (a first main shaft). The other of the first support unit and the second support unit may be a workpiece support, a tailstock, a steady rest, or a chuck mechanism provided on a main shaft different from the first main shaft (a second main shaft).

In a hybrid processing machine that has an AM process function, it is efficient to perform the welding step in a directed energy deposition (DED) scheme, that is, by metal additive manufacturing utilizing a directivity energy deposition method. A hybrid processing machine having an AM process function in a DED scheme enables it, for example, to selectively pad the metal product with metal powder in desired locations and enables a dummy member to be easily welded to a metal product of every shape.

An example of a machine tool that can be used in the method of reprocessing a metal product according to the present invention is described below with reference to the accompanying drawings. Although terms indicating directions (such as "up and down," "left and right," the "X axis, Y axis, Z axis," and the like) are used where appropriate in the description of each embodiment, these terms are intended for explanation and are not intended to limit the present invention. In each figure, the shape or size of each component of the machine tool is not necessarily indicated on the basis of an identical scale. In addition, identical reference signs are used for identical components in each figure.

Figure 1:
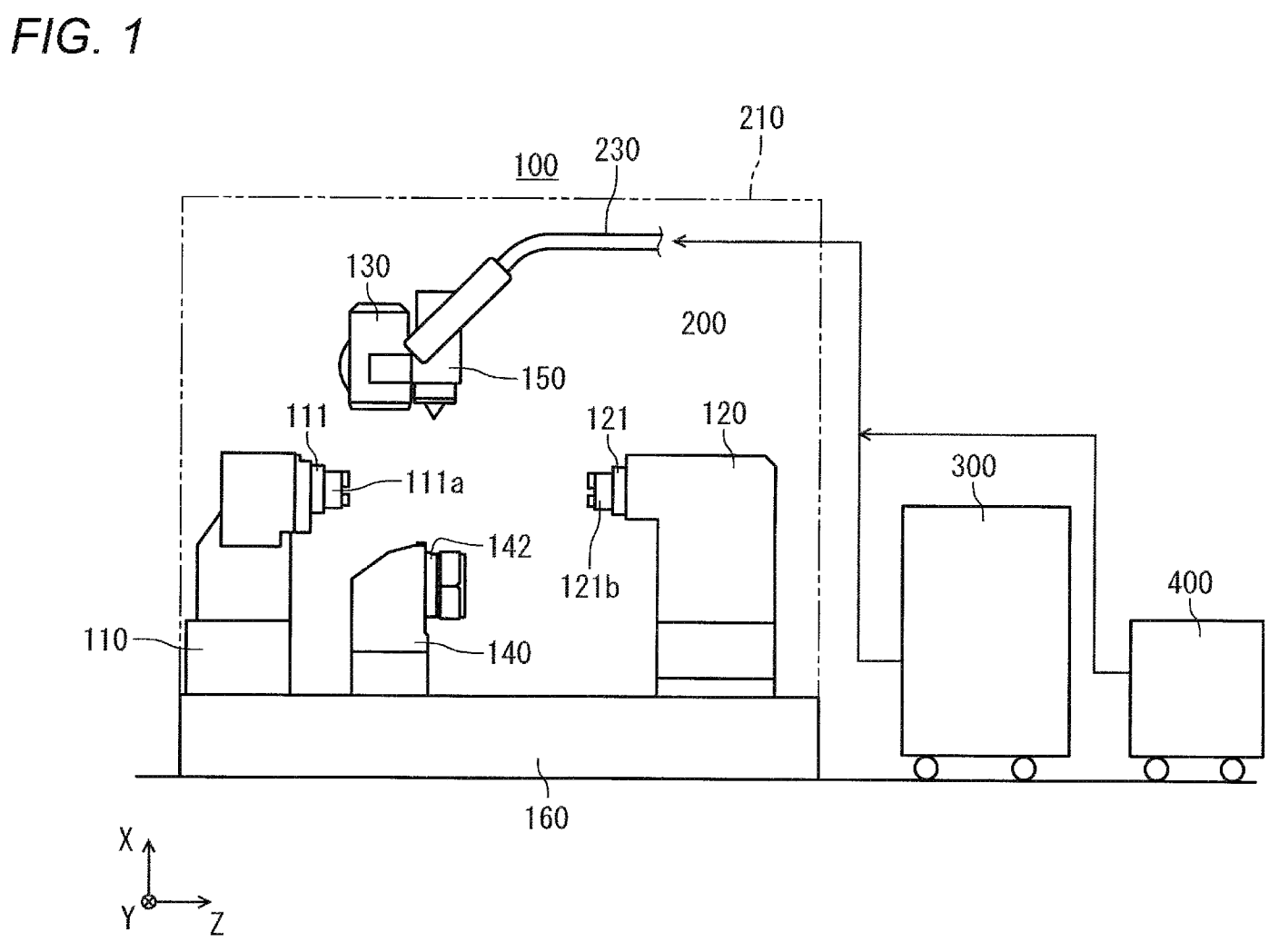

FIG. 1 is a front view that illustrates an overview of the inside of an example of the machine tool used in the present embodiment. FIG. 2 is a perspective view that illustrates how it looks in a machining space 200 when the machine tool 100 performs an AM process. The machine tool 100 is a hybrid processing machine that has an AM process function for a workpiece W and an SM process function for the workpiece W. The hybrid processing machine is, for example, a lathe, a vertical type or horizontal type machining center, a complex processing machine that has a turning function using a fixed tool and a milling function using a rotary tool, or a machine tool where an AM process function is further given to, for example, a five-axis processing machine controlled by two or more pivots in addition to the X axis, the Y axis, and the Z axis. However, the machine tool is not limited thereto.

The overall structure of the machine tool 100 is described first. The machine tool 100 includes a first headstock 110, a second headstock 120, a tool main shaft (a first tool post) 130, a second tool post 140, a head 150 for an additive process, and a bed 160.

The bed 160 is a base member that supports the first headstock 110, the second headstock 120, the tool main shaft 130, and the second tool post 140. The machine tool 100 is placed over a floor of a factory or the like with interposition of the bed 160. The first headstock 110, the second headstock 120, the tool main shaft 130, and the second tool post 140 are provided in the machining space 200 surrounded by a cover body 210, which is referred to as a splash guard.

In FIG. 1, the first headstock 110 and the second headstock 120 are positioned so as to face each other in the Z axis direction. The first headstock 110 and the second headstock 120 include a first main shaft 111 and a second main shaft 121, respectively, which are for rotating the workpiece W in the turning process using the fixed tool. The first main shaft 111 and the second main shaft 121 are each rotatable about a rotation axis parallel to the Z axis. The second headstock 120 is movable in the Z axis direction. The first main shaft 111 and the second main shaft 121 are provided with a first chuck mechanism 111*a* and a second chuck mechanism 121*b*, which hold the workpiece W so that the workpiece W is attachable and detachable. The main shafts with the chuck mechanisms can be utilized as a first support unit that supports the metal product W and a second support unit that supports a dummy member D.

The tool main shaft 130 rotates the rotary tool in the milling process. The tool main shaft 130 is rotatable about a rotation axis parallel to the X axis extending in the vertical direction. The tool main shaft 130 is provided with an attachment and detachment mechanism that holds the rotary tool so that the rotary tool is attachable and detachable. The tool main shaft 130 is movable in the Y axis direction orthogonal to the Z axis direction and extending in the horizontal direction. In addition, the tool main shaft 130 is turnable about a rotation axis parallel to the Y axis.

The tool main shaft 130 is supported by an unillustrated column or the like over the bed 160. The tool main shaft 130 is movable in the X axis direction along the column. The column is movable in the Z axis direction.

The second tool post 140 illustrated in FIG. 1 has a shape of a turret with a plurality of fixed tools for the turning process. The plurality of fixed tools are attached radially on a peripheral surface of the turret-shaped tool post via a tool holder. The second tool post 140 is turnable about a rotation axis parallel to the Z axis via a turning part 142. The turn of the turning part 142 positions a desired fixed tool in a processing location for the workpiece W. The second tool post 140 is movable in the X axis direction and the Z axis direction.

The machine tool 100 includes the AM process head 150 of a DED scheme. The AM process head 150 has a function of a welding torch and is connected to a cable 230 that leads a metal material for addition and a laser beam. The AM process head 150 includes a nozzle for supplying the metal material supplied from the cable 230 to the workpiece W and applying laser beams to the metal material and the workpiece W. For example, metal additive manufacturing proceeds as the workpiece W melts locally because of the heat of the laser beam and metal powder is supplied to the melted portion while melting together and then becoming solidified. As the metal material, for example, powder or a wire of stainless steel, a nickel-based alloy, a titanium-based alloy, or the like can be utilized.

The AM process head 150 is attachable to and detachable from the tool main shaft 130. The AM process head 150 is attached to the tool main shaft 130 in the AM process. Each movement mechanism described above enables the tool main shaft 130 to move in the X, Y, and Z axis directions. Similar to the movement of the tool main shaft 130, the AM process head 150 is also movable in the X, Y, and Z axis directions. The AM process head 150 can be detached from the tool main shaft 130 in the SM process.

Figure 3:
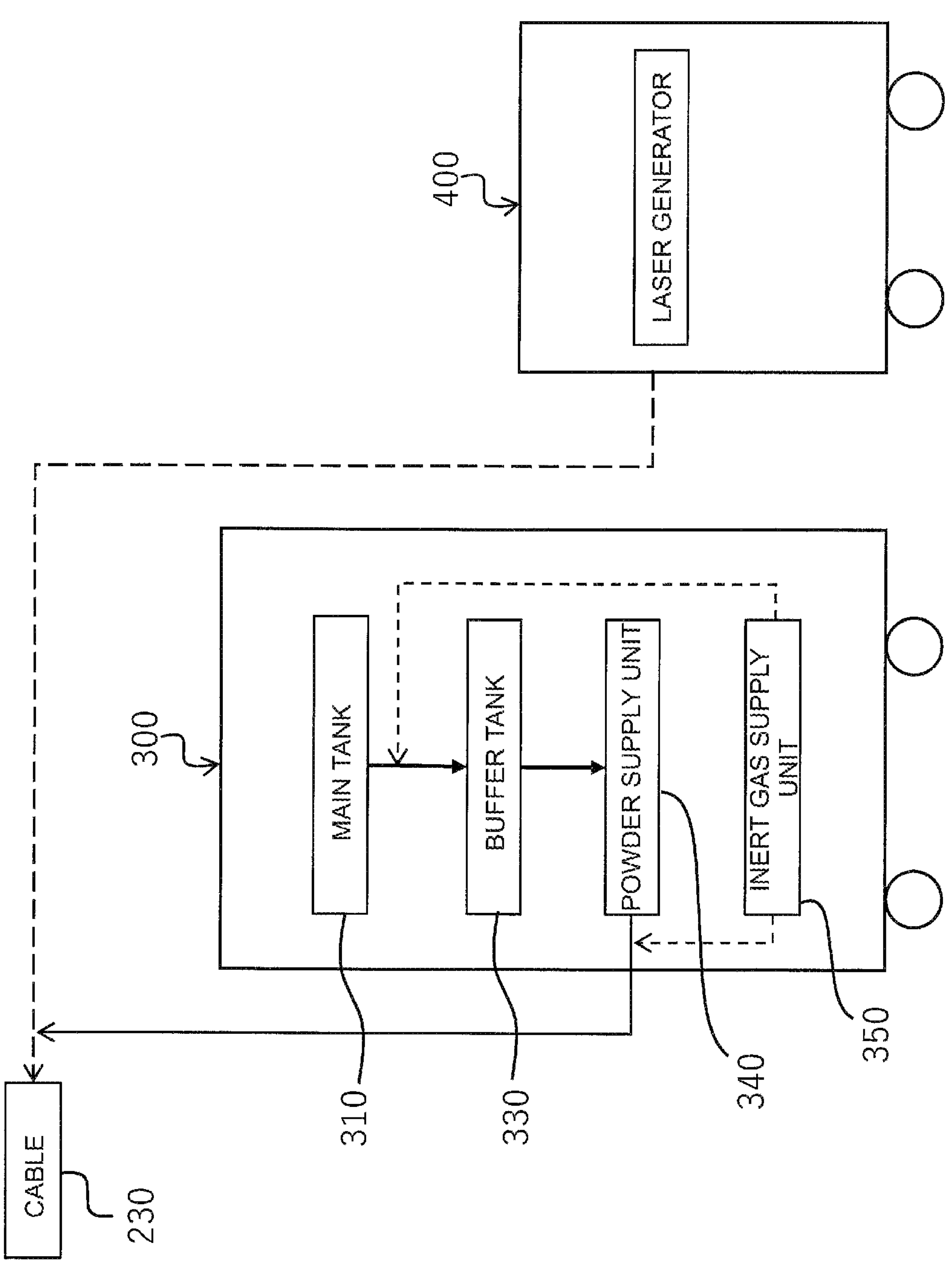
FIG. 3 illustrates an example of configurations of a powder feeder and a laser light generator.

FIG. 3 illustrates an example of configurations of a powder feeder 300 and a laser light generator 400, which introduce metal powder and a laser beam to the cable 230. In the cable 230, a pipe for transferring the metal powder and carrier gas to the AM process head 150 and an optical fiber for leading a laser beam to the AM process head 150 are accommodated. The powder feeder 300 supplies the metal powder to the cable 230. The laser light generator 400 generates laser light. The generated laser light is led to the cable 230 and formed into a beam, and after that, emitted from the nozzle of the AM process head 150.

The powder feeder 300 includes a main tank 310, a buffer tank 330, a powder supply unit 340, and an inert gas supply unit 350. The main tank 310 stores the metal powder and sends the metal powder out of an outlet on the lower side at an appropriate timing. The metal powder sent out is transferred to the buffer tank 330 together with the carrier gas and accommodated temporarily in the buffer tank 330, and after that, transferred to the powder supply unit 340. In the powder supply unit 340, the metal powder is mixed with the carrier gas and led to the cable 230. As the carrier gas, the inert gas supplied from the inert gas supply unit 350 is used.

First Embodiment

Next, the method of reprocessing a metal product in a case where the above-described machine tool is used is further described with reference to FIGS. 4A to 4F.

The welding step (i) for welding a dummy member to the metal product is described first. The welding step includes (a) supporting the metal product by using a first support unit in a machining space, (b) supporting the dummy member by using a second support unit in the machining space, and (c) welding the metal product supported by the first support unit and the dummy member supported by the second support unit.

Also, the welding step can include (A) padding the metal product with a cutting allowance, and (B) welding the dummy member to the cutting allowance. In this case, decrease in the size of the metal product can be inhibited by utilizing the cutting allowance effectively.

Figure 4A:
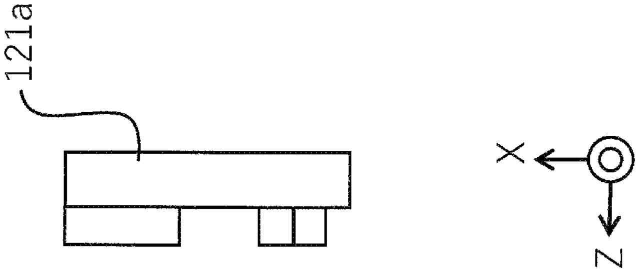
FIG. 4A illustrates a metal product supported by a first support unit, and a second support unit.
Figure 4A:
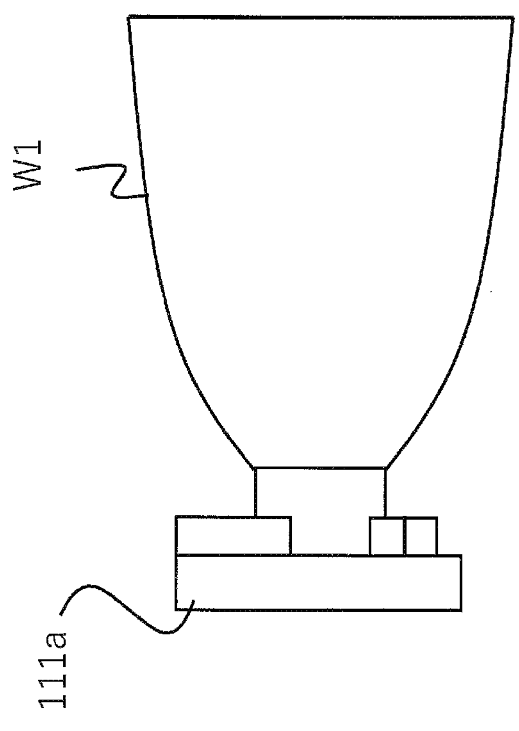

Specifically, in step (a), as illustrated in FIG. 4A, a predetermined end portion (hereinafter, a first end portion) of the metal product W1 as an object to be reprocessed is grasped by a first chuck mechanism 111*a* of the first main shaft 111 as the first support unit. It is just desired to select a portion with a shape that makes the grasp easiest, depending on the metal product W1, as the first end portion grasped by the first chuck mechanism 111*a*. Further, if the metal product W1 has no portion that the first chuck mechanism 111*a* can grasp, it is just desired to weld a dummy member with a shape that facilitates the grasp by the first chuck mechanism 111*a* to the metal product W1 in advance and after that, grasp the dummy member as the first end portion by using the first chuck mechanism 111*a*. That is, the metal product W1 may be a combination of the metal product W1 having been processed into a shape that already has a predetermined function and the dummy member. Although being a rocket nozzle in the illustrated example for instance, the metal product W1 is not limited thereto.

Figure 4B:
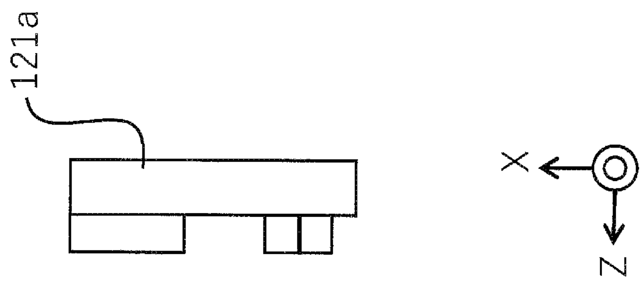
FIG. 4B illustrates how a cutting allowance is formed on the metal product supported by the first support unit.
Figure 4B:
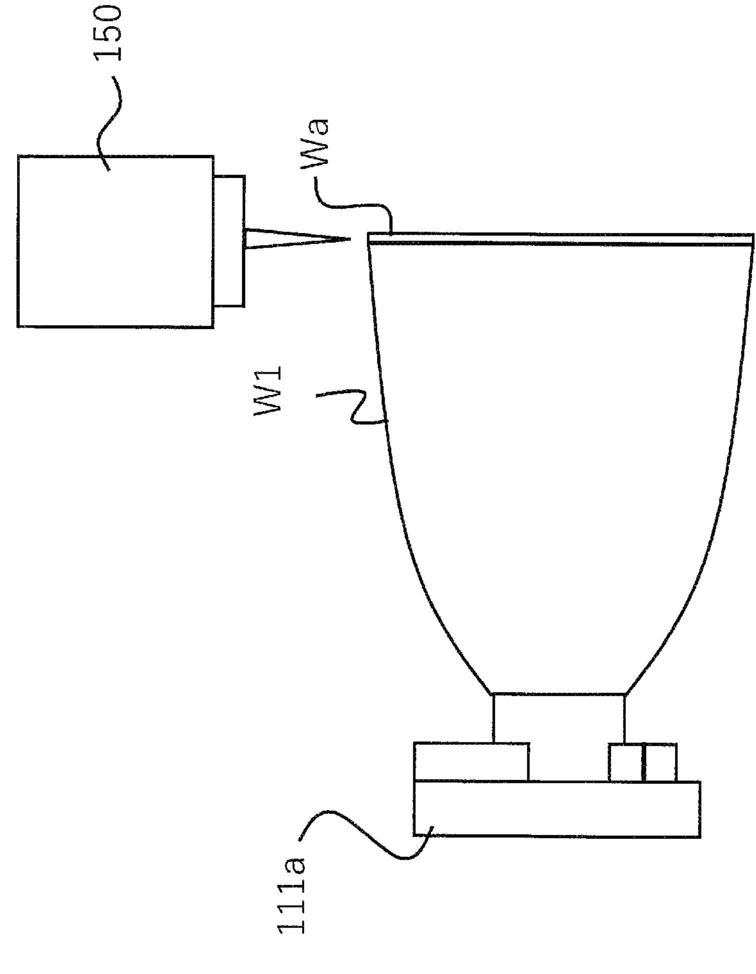

FIG. 4B illustrates a state where a second end portion of the metal product W1 on the opposite side of the first end portion is padded with a cutting allowance Wa. In the illustrated example, the cutting allowance Wa is formed along the entire perimeter of the circular edge of the metal product W1 as the second end portion. The position and size of the cutting allowance Wa are not particularly limited. The padding with the cutting allowance Wa is performed in a DED scheme by using the AM process head 150. From the nozzle of the AM process head 150, metal powder is sprayed and a laser beam is emitted. As the heat of the laser beam melts the metal powder and the second end portion of the metal product W1, the padding by metal additive manufacturing proceeds.

The formation of the cutting allowance Wa may be performed when necessary and may be omitted.

Figure 4C:
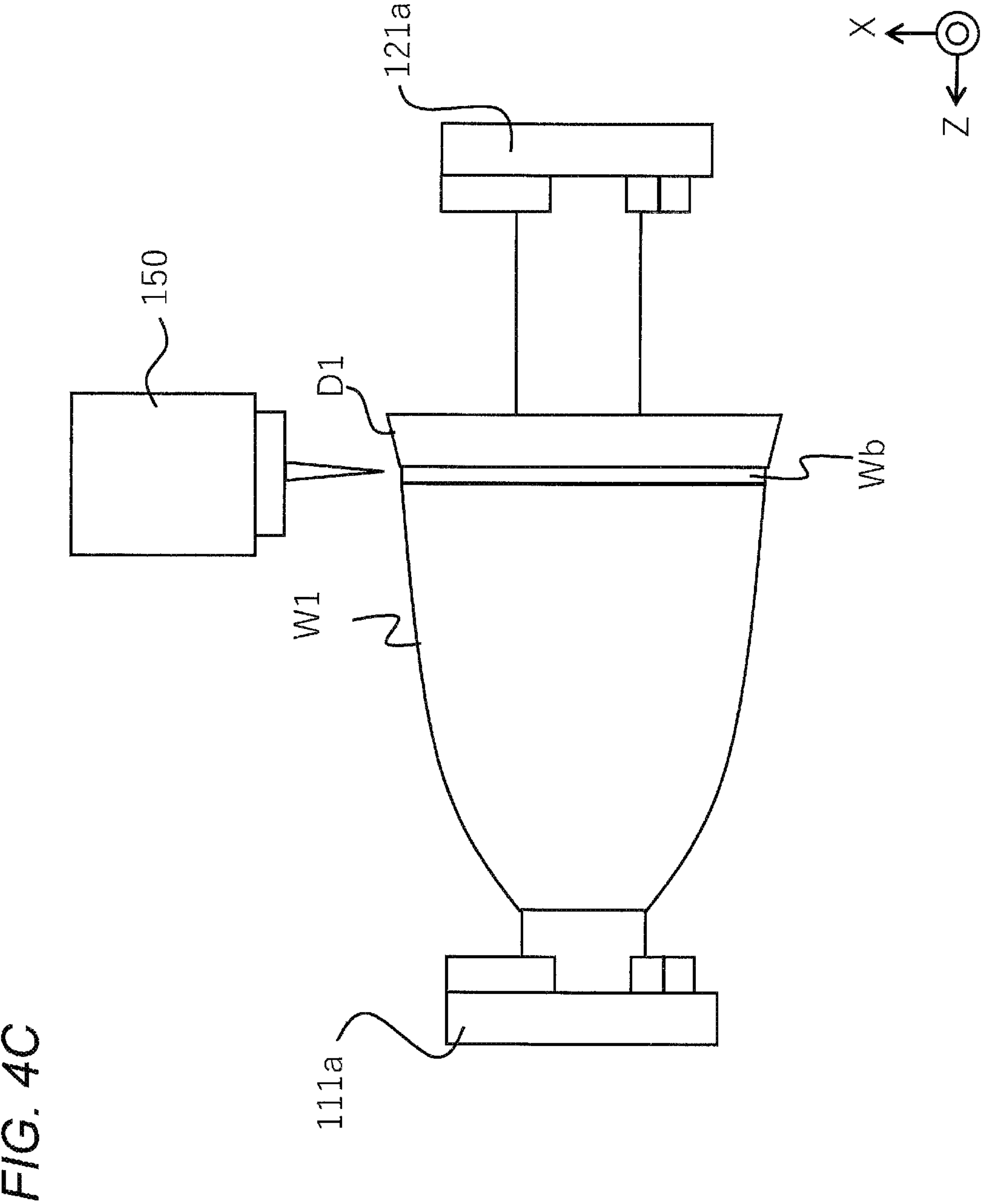
FIG. 4C illustrates how the metal product supported by the first support unit and a dummy member supported by the second support unit are welded.

FIG. 4C illustrates how a dummy member D1 is welded to the cutting allowance Wa with which the metal product W1 is padded. While the shape of the dummy member is not particularly limited, the dummy member D1 in the illustrated example is made up of a disk-like member and a cylindrical member that projects from the center of one of the surfaces of the disk-like member. The disk-like member is sized so that the disk-like member can be welded to the cutting allowance Wa formed on the second end portion of the metal product W1. The cylindrical member is grasped by a second chuck mechanism 121*a* of the second main shaft 121 as the second support unit and fixed. The welding of the cutting allowance Wa and the dummy member D1 is performed by adjusting the positions of the cutting allowance Wa and the dummy member D1 through the position of the second main shaft 121 in the Z axis direction and the X axis direction and aligning both the positions. In the welding, only a laser beam may be emitted from the nozzle of the AM process head 150 and the metal powder may be supplied in the DED scheme to the boundary between the cutting allowance and the dummy member D1. A joint portion Wb is formed through the welding of the cutting allowance Wa and the dummy member D1.

Figure 4D:
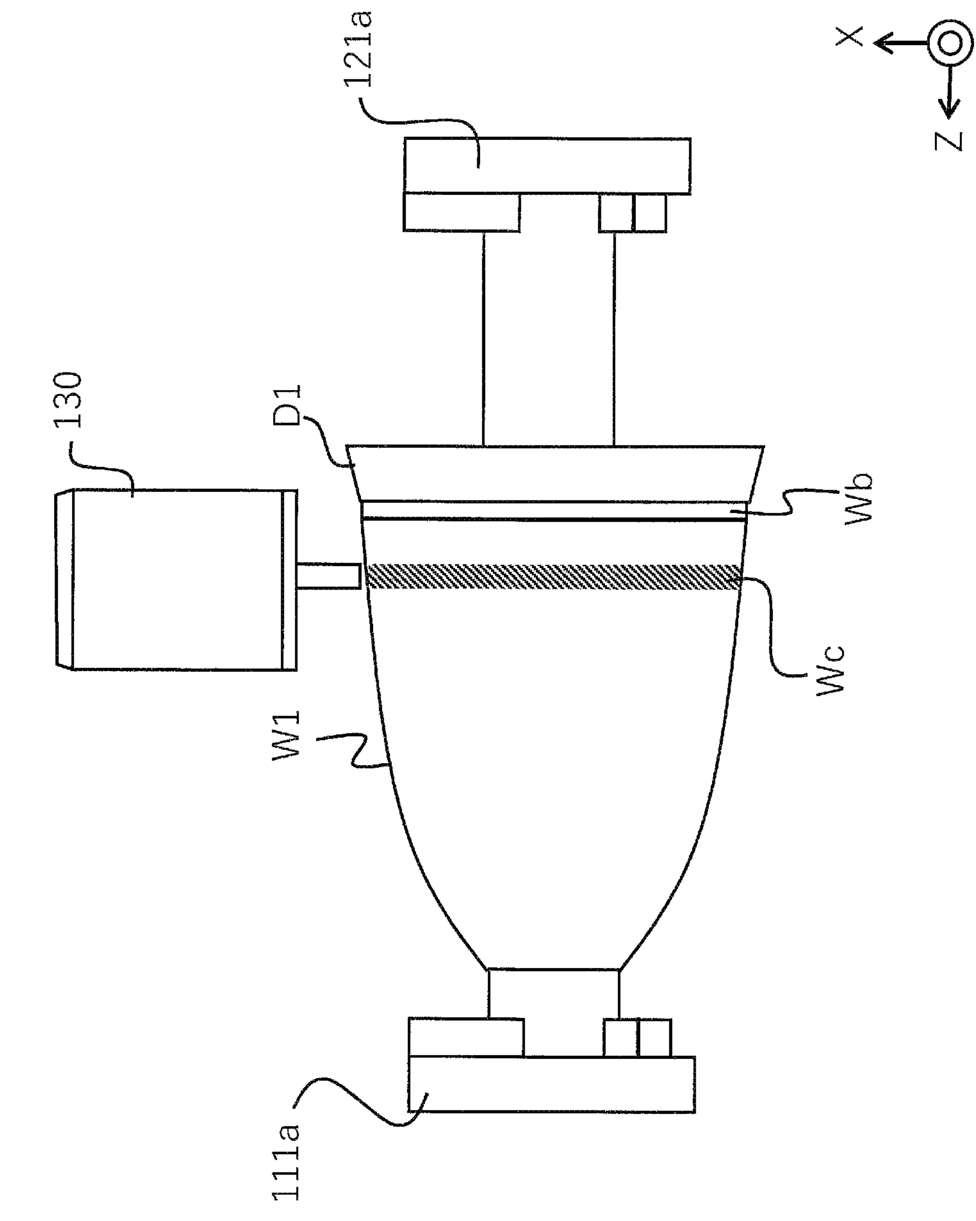
FIG. 4D illustrates how the metal product is reprocessed in a state where the metal product is supported by the first support unit and the dummy member is supported by the second support unit.

FIG. 4D illustrates how the reprocessing step (ii) for reprocessing the metal product W1 is performed in a state where the metal product W1 to which the dummy member D1 is welded is supported by the first support unit (the first main shaft 111) and the dummy member D1 is supported by the second support unit (the second main shaft 121). By the metal product W1 being supported at two points, which are the first main shaft 111 and the second main shaft 121, vibration of the metal product W1 can be prevented and the accuracy of the reprocessing can be increased. In the reprocessing step of the metal product W1, for example, a machining process, such as milling, is performed by using the tool main shaft 130 and a reprocessing portion We is formed. In the reprocessing step, the additive process may be performed or both the removal process and the additive process may be performed.

Figure 4E:
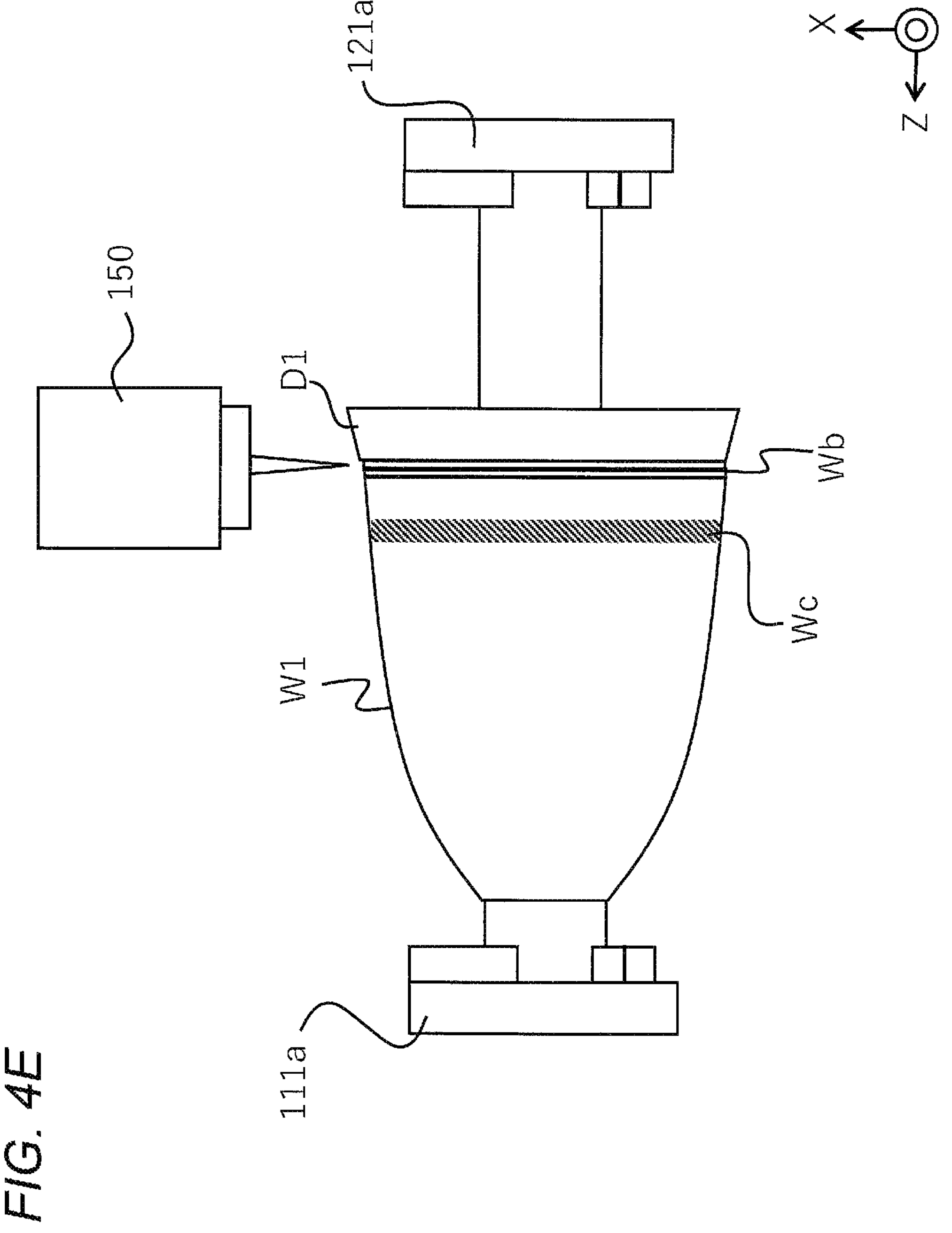
FIG. 4E illustrates how the dummy member is removed from the metal product.

FIG. 4E illustrates how the removal step (iii) for removing the dummy member D1 from the metal product W1 after the reprocessing step is performed by using the AM process head 150. In the removal step, the tool main shaft 130 may be used, or both the tool main shaft 130 and the AM process head 150 may be used. When the AM process head 150 is used as in the illustrated example, it is just desired to cause only a laser beam to be emitted from the nozzle and applied to the joint portion Wb, and melt the joint portion Wb. The melted metal is divided by surface tension toward the metal product W1 and toward the dummy member D1, and the metal product W1 and the dummy member D1 are physically separated.

Figure 4F:
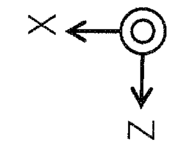
FIG. 4F illustrates the metal product from which the dummy member is removed.
Figure 4F:
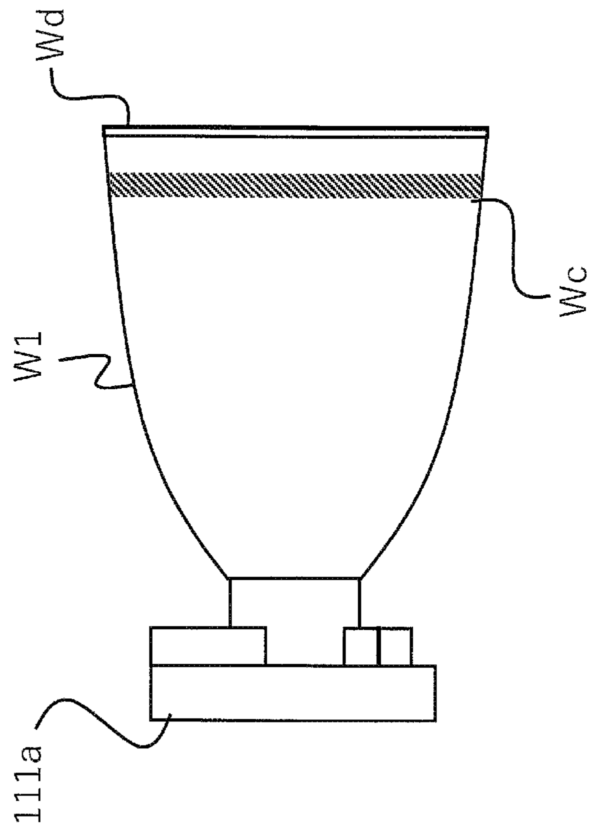

FIG. 4F illustrates the metal product W1 after the dummy member D1 has been removed. A residual portion Wd of the cutting allowance Wa can remain on the circular edge of the metal product W1 as the second end portion. The residual portion Wd may be removed by using the tool main shaft 130 and may be formed so that the shape of the second end portion is adjusted. The residual portion Wd may be left if no function of the metal product W1 is affected.

Second Embodiment

Figure 5:
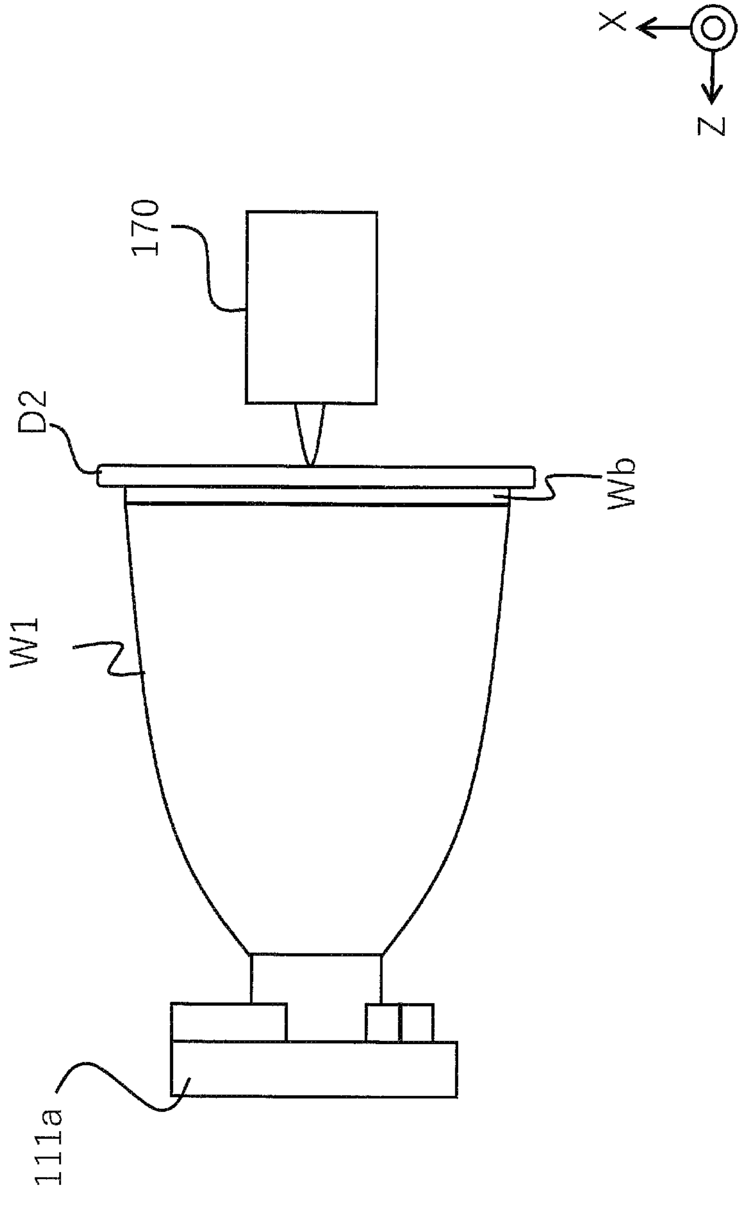
FIG. 5 illustrates an instance of another embodiment of the method of reprocessing the metal product.

FIG. 5 illustrates an instance of another embodiment of the method of reprocessing a metal product W1. The metal product W1 has a shape similar to that in the first embodiment. A first end portion of the metal product W1 is supported by a first main shaft 111, which is a first support unit, as in the first embodiment. A dummy member D2 is shaped like a disk with a diameter larger than that of a circle formed by the circular edge of the metal product W1, which is a second end portion. In the boundary between the circular edge of the metal product W1 as the second end portion and the dummy member D2, a joint portion Wb is formed by welding. Herein, the second end portion of the metal product W1 is supported by a tailstock 170 as a second support unit being pressed onto the center of one of the surfaces of the dummy member D2 joined to the second end portion. Even in such a state, vibration in the reprocessing step for machining the metal product W can be inhibited.

Third Embodiment

Figure 6:
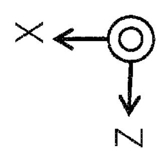
FIG. 6 illustrates an instance of an embodiment of a method of reprocessing another metal product.
Figure 6:
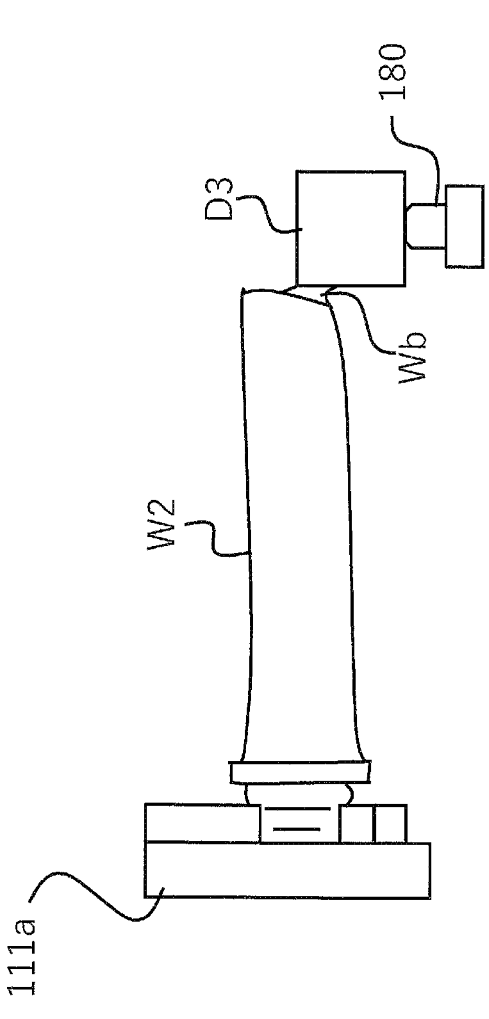

FIG. 6 illustrates an instance of an embodiment of a method of reprocessing a metal product W2 with a different shape from that of the metal product W1. The metal product W2 in the illustrated example is a turbine blade but is not limited thereto. A first end portion of the metal product W2 is a basis of the blade and as in the first embodiment, is supported by a first main shaft 111, which is a first support unit. A dummy member D3 is shaped like a cylinder with a central axis that is in the X axis direction. A blade distal end portion, which is a second end portion on the opposite side to the first end portion, is welded to part of the peripheral surface of the cylindrical dummy member D3. In the boundary between the blade distal end portion of the metal product W2 as the second end portion and the dummy member D3, a joint portion Wb is formed by welding. Herein, the second end portion of the metal product W2 is supported by a workpiece support 180 as a second support unit being pressed onto the center of the lower surface of the dummy member D3 (the bottom surface on one of the sides of the cylinder) joined to the second end portion. Even in such a state, vibration in the reprocessing step for machining the metal product W2 can be inhibited.

Fourth Embodiment

Figure 7:
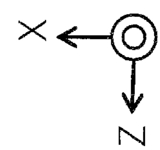
FIG. 7 illustrates an instance of another embodiment of the method of reprocessing aforesaid another metal product.
Figure 7:
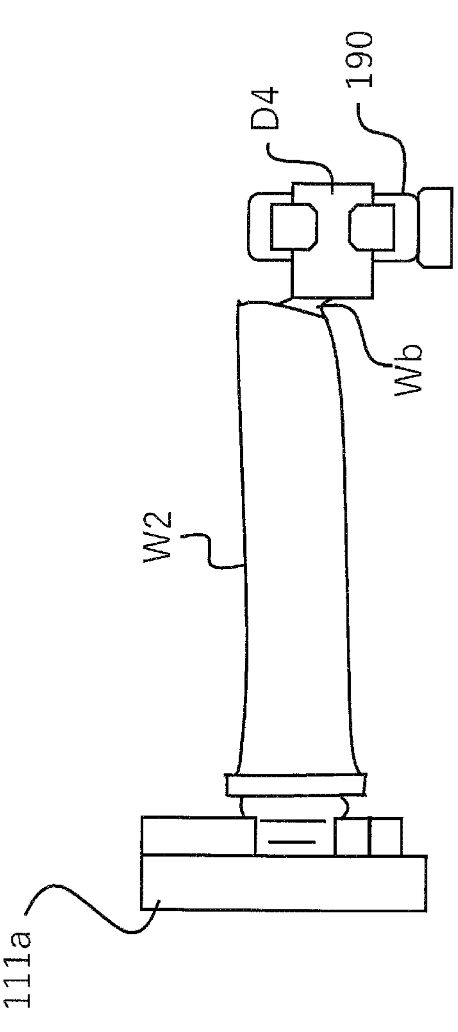

FIG. 7 illustrates an instance of another embodiment of the method of reprocessing the metal product W2. The metal product W2 has a shape similar to that in the third embodiment. A first end portion of the metal product W2 is supported by a first main shaft 111, which is a first support unit, as in the first embodiment. A dummy member D4 is shaped like a cylinder with a central axis that is in the Z axis direction. A second end portion of the metal product W2 is welded to a bottom surface of the cylindrical dummy member D4, which is on one of the sides, and in the boundary between the second end portion of the metal product W2 and the dummy member D4, a joint portion Wb is formed by welding. Herein, the second end portion of the metal product W2 is supported by part of the peripheral surface of the cylindrical dummy member D4 joined to the second end portion being surrounded and sandwiched by a steady rest 190, which is a second support unit. Even in such a state, vibration in the reprocessing step for machining the metal product W2 can be inhibited.

When a metal product that has an asymmetrical shape, such as a turbine blade, is reprocessed, it is desirable to perform a step for adjusting the position of the metal product prior to the reprocessing step so that an acute angle of 30° or less (desirably 10° or less) is formed between a largest principal plane of an imaginary minimum rectangular parallelepiped where the metal product is accommodated and the vertical direction. Accordingly, the metal product can be machined with higher accuracy in the reprocessing step.

Figure 8:
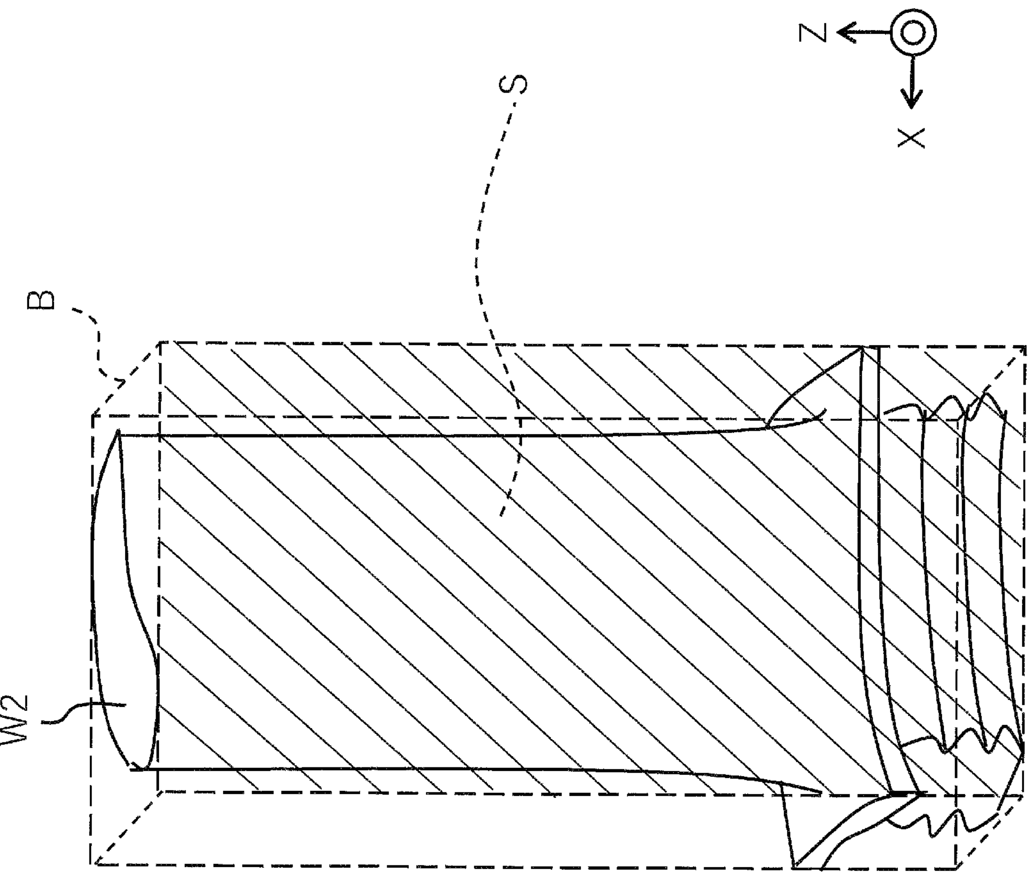
FIG. 8 is a conceptual diagram that illustrates an imaginary minimum rectangular parallelepiped where the metal product is accommodated.

FIG. 8 is a conceptual diagram, which illustrates an example of the turbine blade as the metal product W2 and an imaginary minimum rectangular parallelepiped B where the metal product W2 is accommodated. A hatch pattern of oblique lines is given to one of largest principal planes S of the imaginary minimum rectangular parallelepiped B. The position of the metal product W2 is adjusted so that the above-described acute angle is formed between the largest principal plane S and the vertical direction (that is, the X axis direction). It is most desirable that the angle formed between the largest principal plane S of the imaginary minimum rectangular parallelepiped B and the vertical direction be 0° (that is, both be parallel).

The description of the embodiments above presents examples in every respect and is not limiting. Those skilled in the art can make alterations and changes as appropriate. The scope of the present invention is indicated not by the above-described embodiments but by the claims. Further, the scope of the present invention includes changes from the embodiments within the claims and the scope equivalent thereto.

INDUSTRIAL APPLICABILITY

The present invention is suitable for, for example, reprocessing or repair of a large metal product formed of an expensive metal material, such as a nickel-based alloy or a titanium-based alloy.

REFERENCE SIGNS LIST

- 100: Machine tool
  - 110: First headstock
    - 111: First main shaft
      - 111*a*: First chuck mechanism
  - 120: Second headstock
    - 121: Second main shaft
      - 121*a, b*: Second chuck mechanism
  - 130: Tool main shaft (First tool post)
  - 140: Second tool post
    - 142: Turning part
  - 150: AM process head
  - 160: Bed
  - 170: Tailstock
  - 180: Workpiece support
  - 190: Steady rest
- 200: Machining space
  - 210: Cover body (Splash guard)
  - 230: Cable
- 300: Powder feeder
  - 310: Main tank
  - 330: Buffer tank
  - 340: Powder supply unit
  - 350: Inert gas supply unit
- 400: Laser light generator
- W: Workpiece
- W1, W2: Metal product
- Wa: Cutting allowance
- Wb: Joint portion
- Wc: Reprocessing portion
- Wd: Residual portion
- D, D1, D2, D3, D4: Dummy member

What is claimed:

1. A method of reprocessing a metal product, the method comprising:

a welding step for welding a dummy member to the metal product;

a reprocessing step for reprocessing the metal product in a state where the metal product is supported by a first support unit and the metal product is supported by a second support unit via the dummy member welded to the metal product; and a removal step for removing the dummy member from the metal product after the reprocessing step, wherein the metal product is grasped by the second support unit and fixed.

2. The method of reprocessing the metal product according to claim 1, wherein the welding step and the reprocessing step are performed in a machining space of a machine tool that includes a welding torch used in the welding step and a tool main shaft used in the reprocessing step.

3. The method of reprocessing the metal product according to claim 2, wherein the welding step includes supporting the metal product by using the first support unit in the machining space;

supporting the dummy member by using the second support unit in the machining space; and welding the metal product supported by the first support unit and the dummy member supported by the second support unit.

4. The method of reprocessing the metal product according to claim 2, wherein the machine tool includes a complex lathe, one of the first support unit and the second support unit is a chuck mechanism provided on a main shaft, and the other of the first support unit and the second support unit is a workpiece support, a tailstock, a steady rest, or a chuck mechanism provided on a main shaft different from the main shaft.

5. The method of reprocessing the metal product according to claim 1, wherein the welding step includes padding the metal product with a cutting allowance; and welding the dummy member to the cutting allowance.

6. The method of reprocessing the metal product according to claim 1, wherein the welding step is performed by metal additive manufacturing in a DED scheme.

7. The method of reprocessing the metal product according to claim 1, the method further comprising a step for adjusting a position of the metal product prior to the reprocessing step so that an acute angle of 30° or less is formed between a largest principal plane of an imaginary minimum rectangular parallelepiped where the metal product is accommodated and a vertical direction.

8. The method of reprocessing the metal product according to claim 1, wherein the metal product is a rocket nozzle or a turbine blade.

9. The method of reprocessing the metal product according to claim 1, wherein the metal product is formed of at least one selected from a group consisting of a titanium-based alloy, a cobalt-based alloy, and a nickel-based alloy.

* * * * *